3,123,617
3-PHENYL-7-PYRAZOLYL COUMARINS
Heinrich Häusermann, Riehen, near Basel, Switzerland, assignor to J. R. Geigy A.-G., Basel, Switzerland
No Drawing. Filed Apr. 26, 1962, Ser. No. 190,241
Claims priority, application Switzerland Apr. 27, 1961
6 Claims. (Cl. 260—310)

The present invention concerns new 3-phenyl-7-pyrazolyl coumarins, processes for the production thereof and their use as optical brightening agents.

It has been found that valuable coumarin derivatives are obtained if a 3-phenyl-7-hydrazinocoumarin which can be further substituted, or a compound which reacts in the same way as this coumarin compound, is condensed with a compound having an aliphatic $\alpha,\gamma$-dicarbonyl group or with a compound containing a grouping which reacts like such an aliphatic $\alpha,\gamma$-dicarbonyl group. If necessary the 3-phenyl-7-pyrazolyl-(1')-coumarin obtained is then sulphonated and if desired also amided by way of the sulphonic acid halides.

3 - phenyl-7-hydrazinocoumarins and, therefore, also the new 3-phenyl-7-pyrazolyl coumarins which can be used according to the invention can contain single or several substituents at the 3-phenyl radical, for example alkyl groups such as the methyl, ethyl, propyl, isopropyl, n-butyl groups; halogens such as fluorine, particularly however, chlorine, or also bromine; alkoxy groups such as methoxy, ethoxy, propoxy, butoxy groups; alkylene or ether groups bound in positions vicinal to the benzene ring such as tetramethylene or methylenedioxy groups; also sulphonic acid groups, sulphamide groups and sulphamide groups substituted at the nitrogen atom for example possibly substituted N-alkyl- and N,N-dialkyl-sulphamoyl groups such as N-methyl-, N-ethyl-, N-butyl-, N-hydroxyethyl-, N - methoxyethyl-, N-ethoxyethyl-, N-dimethylaminoethyl-, N - dimethylaminopropyl-, diethylaminoethyl-sulphamoyl groups and N,N-dimethyl- and N,N-diethyl-sulphamoyl groups; alkylsulphonyl groups such as methylsulphonyl, ethylsulphonyl, butylsulphonyl groups; carbalkoxy groups such as carboxylic acid methyl ester, carboxylic acid ethyl ester, carboxylic acid butyl ester, carboxylic acid benzyl ester or carboxylic acid cyclohexyl ester groups; carboxylic acid amide groups and carboxylic acid amide groups substituted at the nitrogen atom such as carboxylic acid diethyl, dibutyl or dicyclohexyl amide groups.

In the 4-position of the coumarins either usable or produced according to the invention there is preferably a hydrogen atom, or a lower alkyl group, in the latter case preferably the methyl group. Also the benzo radical of the coumarin can be further substituted, e.g., by methyl in, for example, the 6-position.

The 3-phenyl-7-hydrazinocoumarins usable as starting materials are obtained easily from the known 3-phenyl-7-aminocoumarins by diazotisation and reduction of the diazo group to the hydrazino group. The usual agents are used for the reduction, e.g., soluble salts of sulphurous acid, zinc in alkaline solution or stannous salts in acid solution. Instead of the free hydrazine compounds, derivatives thereof which react in the same way can be used, for example their more stable salts with strong mineral acids such as the hydrochlorides, hydrobromides, sulphates, also possibly the corresponding hydrazino N-sulphonic acids or the corresponding N-acyl hydrazino compounds which are condensed with the dicarbonyl compounds under conditions which liberate the hydrazino groups at the same time.

In the compounds having an aliphatic $\alpha,\gamma$-dicarbonyl grouping usable according to the invention, this divalent grouping can be bound to either hydrogen or to monovalent organic radicals, e.g., alkyl, aralkyl radicals such as the benzyl radical, cycloalkyl radicals such as the cyclohexyl radical, aryl radicals such as phenyl, alkylphenyl, alkoxyphenyl, halogenphenyl radicals, i.e., dialdehydes, $\beta$-ketoaldehydes and $\alpha,\gamma$-diketones or compounds which react in the same way as these can be used as starting materials. The mesocarbon atom of this $\alpha,\gamma$-dicarbonyl grouping can also contain a monovalent substituent of the type given above, particularly a lower alkyl group.

Compounds usable according to the invention which have an aliphatic $\alpha,\gamma$-dicarbonyl grouping are the 1,3-diketones such as, e.g., acetyl acetone, propionyl acetone, butyryl acetone, acetyl-isobutyryl methane, acetyl-caproyl methane, dibenzoyl methane, benzoyl acetone, propionyl acetophenone, butyryl acetophenone, phenyl acetyl acetone; the $\beta$-ketoaldehydes or acetals and hydroxymethylene ketones which react in the same way as these, e.g., $\beta$-ketobutyraldehyde dimethyl acetal, formyl acetone or hydroxymethylene acetone, 2-hydroxymethylene diethyl ketone, diethyl acetyl acetaldehyde, trimethylacetyl acetaldehyde, isovaleryl acetaldehyde, $\omega$-formyl acetophenone or $\omega$-hydroxymethylene acetophenone, hydroxymethylene cyclohexanone; $\beta$-dialdehydes or acetals, $\alpha$-acyloxymethylene aldehydeacetals and $\alpha$-alkoxymethylene aldehyde acetals which react like these, e.g., malonic aldehyde tetraethyl acetal, $\beta$-ethoxyacrolein acetal. Examples of compounds usable according to the invention which contain a grouping which reacts like an aliphatic $\alpha,\gamma$ - dicarbonyl radical are the $\alpha$-hydroxymethylene ketones already mentioned as well as their ethers, esters or anilides and also their aldehyde acetals or ketoacetals. Derivatives of the dialdehydes, aldehyde ketones or diketones mentioned above can be used in which only one or both of the carbonyl groups are acetalised. In addition, derivatives of the $\alpha,\gamma$-dicarbonyl compounds can be employed which, instead of carbonyl groups, contain non-cyclic aldimide or ketimide groups or an -aminomethylene carbonyl or carbimide group as for example, $\beta$-anilino-acrolein anil.

Finally, instead of the $\alpha,\gamma$-dicarbonyl compounds mentioned above, also their addition products with acid alkali metal salts of sulphurous acid can be employed, the condensation conditions being advantageously so chosen that the carbonyl group is regenerated. All organic radicals in these compounds can possibly contain inert substituents.

The 7-hydrazino-3-phenylcoumarin or a derivative reacting in the same way is condensed with the 1,3-dicarbonyl compound or with a corresponding acetal advantageously in a polar organic solvent in the presence of protons or of acid compounds which accelerate the condensation. A suitable solvent is glacial acetic acid; this can possibly be used mixed with other solvents. Further details regarding the advantageous performance of the condensation can be seen from the following examples.

A further process for the production of the 7-pyrazolyl-3-phenylcoumarins according to the invention is the reaction of 7-hydrazino-3-phenylcoumarins with compounds containing an $\alpha,\beta$-alkinyl carbonyl group or a grouping reacting in the same way.

For example, $\alpha,\beta$-alkinyl ketones or aldehydes or acetals thereof as well as $\alpha$-halogen-$\alpha,\beta$-alkenyl ketones or aldehydes or their acetals are used. In these compounds, the carbon atom in the $\beta$-position of the alkinyl or alkenyl radical can contain either hydrogen only or also organic radicals such as alkyl or phenyl radicals.

As alkinyl ketones and aldehydes or compounds which react as such, are used, for example, phenylethinyl-phenyl ketone, propargyl aldehyde-diethyl acetal, methylpropargyl aldehyde-diethyl acetal, phenylpropargyl aldehyde, phenylpropargyl aldehyde-diethyl acetal, α-bromocrotonic aldehyde, α-bromocinnamaldehyde, α-bromoacrolein, α-bromoacrolein diethyl acetal, α-bromostyrene-phenyl ketone (α-bromochalcone).

A third process suitable for the production of the 7-pyrazolyl-3-phenylcoumarins according to the invention consists in condensing the 3-phenyl-7-hydrazinocoumarins mentioned above with compounds having α,β-alkenyl carbonyl groups or with compounds containing groups which react under the condensation conditions like an α,β-alkenyl carbonyl group, to form 7-pyrazolinyl-3-phenylcoumarins and then dehydrogenating these to the corresponding 7-pyrazolyl-3-phenylcoumarins.

Principally the chalcones, i.e., for example, α-benzylidene ketones which can be reacted in the known manner with hydrazines to form pyrazolines are compounds usable according to the invention having alkenyl carbonyl groups. Examples thereof are benzalacetone, styrene ethyl ketone, styrene-tert. butyl ketone, phenylvinyl ketone, phenylpropenyl ketone. Here also, the benzene rings can contain the usual inert substituents such as alkyl, halogen, alkoxy groups.

As compounds containing a grouping which under the reaction conditions reacts like an α,β-alkenyl carbonyl group, the ketones are mentioned which contain an electrophilic, mobile substituent at the β-carbon atom which can be split off, for example halogen, or an amino group, e.g., the tertiary amino group of Mannich bases.

The condensation of the α-ylidene ketones with the hydrazino group to give pyrazoline is performed advantageously in organic-acid solution, for example in the presence of acetic acid or mineral acids such as halogen hydracid. β-Halogen ketones are condensed advantageously in the presence of acid binding agents, e.g., alkali carbonate. Mannich bases are reacted in a neutral medium and their hydrohalides are reacted in the presence of alkali carbonate.

The pyrazolinyl substituents are dehydrogenated to the pyrazolyl substituents, for example by treatment with quinones in organic solution, e.g., with chloraniline in xylene, by treatment with halogens such as chlorine or bromine, or by treatment with other oxidising agents such as sulphur or the atmosphere in the presence of oxygen carriers such as iron salts.

In this case also the ring is closed advantageously in an acid medium.

A further modification of the process for the production of 3-phenyl-7-pyrazolyl-coumarins consists in condensing benzaldehydes which contain in the 2-position, a hydroxyl group or a substituent which can be converted into a hydroxyl group and in the 4-position contain a possibly substituted pyrazole group, by methods known per se with those derivatives of acetic acid which contain a phenyl or a substituted phenyl radical in the α-carbon atom, to form the corresponding β-phenylacrylic acid derivative and possibly liberating the group in the o-position to the acryl radical in the β-phenyl radical as a hydroxyl group and closing the ring with the carboxyl function of the acrylic acid radical to form the coumarin ring. The benzaldehydes necessary as starting materials for this process are, e.g. 2-hydroxy-4-pyrazolyl benzaldehyde and the benzaldehyde derivatives substituted in the pyrazole nucleus. Particularly favourable however, are the 4-pyrazolyl benzaldehydes which contain an alkoxy group in the 2-position as a substituent which can be converted into a hydroxy group. The 2-hydroxy-4-pyrazolyl benzaldehydes can be easily produced by the Reimer-Tiemann synthesis by introduction of an aldehyde group in o-position of the m-pyrazolyl phenol by means of chloroform and caustic potash solution.

As condensable derivatives of acetic acid which contain a phenyl group or a substituted phenyl group at the α-carbon atom, for example, phenylacetic acid or its esters, particularly the alkyl esters, but preferably phenylacetic acid nitriles (benzyl cyanides) are employed.

In both starting materials, it is possible for the aromatic rings to be further substituted, particularly by substituents which are inert under the reaction conditions such as halogen, alkyl groups and, possibly, also alkoxy groups.

The condensation to the β-phenylacrylic acid compound is performed by methods known per se, for example in alcohol in the presence of caustic alkalies, alkali alcoholates or piperidine. If o-alkoxy aldehydes are used for the condensation, then this is followed by the liberation of the hydroxyl group which is performed advantageously with anhydrous aluminium chloride in inert organic solvents such as benzene, chlorobenzene or nitrobenzene, possibly also in the aluminium chloride-sodium chloride melt, in the pyridine-chlorohydrate melt or also it is performed with a solution of hydrogen bromide in glacial acetic acid. Often the coumarin ring is closed in the same step. For this it is not necessary that the carboxyl group of the acrylic acid radical is present in the free form; it can also be present in modified form as carboxylic acid ester, carboxylic acid amide and, preferably, as nitrile group.

If the coumarin ring is not closed when the alkoxy group is dealkylated or if a β-(2-hydroxyphenyl)-acrylic acid derivative is obtained as reaction product in the first step, the ring is closed advantageously with a solution of hydrogen halide in a low fatty acid. Other condensing agents, however, can also be used, for example zinc chloride or concentrated phosphoric acid.

The 7-pyrazolyl-3-phenyl coumarins obtained according to the invention can contain a sulphonic acid group, a sulphamide group or a sulphamide group substituted at the nitrogen atom at the 3-phenyl radical. These groups can already be present in the 3-phenyl-7-hydrazinocoumarins used as reaction component such as, e.g., in the 3-phenyl-7-hydrazinocoumarin-3'- or -4'-sulphonic acid derivatives or in the 3-phenyl-7-hydrazinocoumarin-3'- or -4'- N-diethylsulphamoyl derivatives. However, the sulpho group can often be introduced in a simple manner only after the condensation reaction according to the invention. The sulphonic acid group formed, advantageously in m- or p-position of the 3-phenyl radical, if desired can be modified into the sulphonic acid halide group by known methods, e.g. with inorganic acid chlorides such as thionyl chloride. The latter group is substituted with amines by known methods. In the same way, the amide group can be introduced by treatment of 3-phenyl-7-pyrazolyl coumarine compound with chlorosulphonic acid and then reaction of the sulphochloride formed with the amines.

The 7-pyrazolyl-3-phenylcoumarins usable or obtainable according to the invention are colourless to weakly yellow coloured crystalline substances. They correspond to the general formula

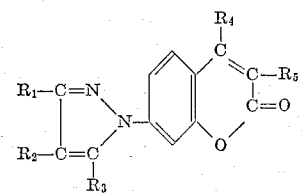

In this formula, each of $R_1$, $R_2$ and $R_3$ represents hydrogen or an aliphatic, alicyclic, araliphatic or aromatic radical, $R_5$ represents a possibly substituted phenyl radical and $R_4$ preferably represents hydrogen or a lower alkyl. Dissolved in organic solvents such as alkanols, dioxan, dimethyl formamide, the new 7-pyrazolyl-3-phenylcoumarins have a strong violet fluorescence. They lend to yellowed organic material a pure white appearance in daylight when very small amounts are incorporated into or applied to such material by the usual methods and, therefore, are valuable optical brightening agents. Compared with known, comparable optical brighteners of the coumarin series containing a nitrogen substituent in the 7-position, they are distinguished by better fastness to light, a more neutral white effect, and, therefore, a better appearance in artificial light, and by good temperature stability.

Preferred 3-phenyl-7-pyrazolyl-coumarins are those having the formula

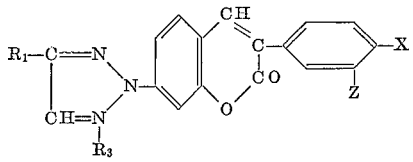

wherein $R_1$ is hydrogen, methyl, ethyl, propyl, phenyl, and benzyl
$R_3$ is hydrogen, methyl and phenyl and
X is hydrogen, chlorine and methyl and
Z is hydrogen, $—SO_3H$, $—SO_2NH_2$, $—SO_2—NH—CH_3$, $—SO_2—NH—CH_2CH_3$, $—SO_2—NH—CH_2CH_2OH$, $—SO_2—NH—CH_2CH_2OCH_3$,
$—SO_2—NH—CH_2CH_2OCH_2CH_3$,
$—SO_2—NH—CH_2CH_2N(CH_2CH_3)CH_2CH_3$  $—SO_2—NH—CH_2CH_2N(CH_3)CH_3$
$—SO_2—N(CH_3)—CH_3$  $—SO_2—N(CH_2CH_3)—CH_2CH_3$ Of these particularly good coumarin compounds, the compounds having the formula

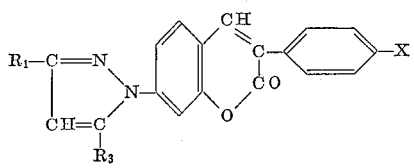

wherein $R_1$ is hydrogen, methyl, and ethyl
$R_3$ is hydrogen and methyl and
X is hydrogen, methyl and chlorine are especially valuable.

They are suitable, therefore, as optical brightening agents in particular for synthetic polyester fibres, e.g., fibres from polymeric esters of terephthalic acid and polyvalent alcohols and for cellulose acetate fibres, in particular for cellulose triacetate fibres and also for synthetic polyamide fibres. They also improve the appearance of polymeric and copolymeric acrylonitrile when incorporated into the melts of the resins before spinning, of synthetic substances such as polyvinyl chloride, polyvinylidene chloride, polystyrene, polyethylene, polypropylene, polymethacrylate, of copolymers of these substances with each other or with other polymerisable compounds. They can also be incorporated in dressings, e.g., in finishings for textile fibres such as polyvinyl alcohol, or in resins or resin precondensates which are used for textile treatments.

For application to textiles, the 7-pyrazolyl-3-phenylcoumarins are used advantageously from an aqueous bath in a finely distributed form in the presence of dispersing agents; they are incorporated into polymeric synthetic substances, for example, by dissolving in a monomeric or low molecular starting material before polymerisation or by dissolving in a plasticising component or by adding to the spinning mass before threads are formed.

For application to textiles from an aqueous bath, about 0.01 to 0.1% of the weight of the fibre of 7-pyrazolyl-3-phenylcoumarins are used advantageously; the amount used for the brightening of synthetic substances can be from 0.05 to 1% depending on the material to be brightened. The 7-pyrazolyl-3-phenylcoumarins can also be used in washing agents. About 0.05 to 0.2% of the dry weight of the washing agents of the brightening agents according to the invention are added thereto.

The following examples illustrate the invention. Where not otherwise expressly stated, the parts are given therein as parts by weight. The temperatures are given in degrees centigrade. The relationship of parts by weight to parts by volume is as that of grammes to cubic centimeters.

*Example 1*

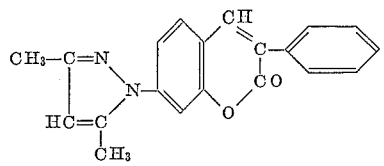

25.2 parts of 3-phenyl-7-hydrazinocoumarin are added to a solution of 20 parts of acetyl acetone and 250 parts of glacial acetic acid and the whole is heated for 1 hour at 100°. After cooling, the precipitate obtained is filtered off, washed with cold ethanol and recrystallised from toluene with the addition of decolouring charcoal. In this way, 3-phenyl-7-[3',5'-dimethylpyrazolyl-(1')]-coumarin is obtained in almost colourless, fine needles which melt at 206°.

The product dissolves in acetone with a blue-violet fluorescence. The new compound is very well suited for the brightening of various organic substances, in particular synthetic textile fibres and polymeric synthetic substances.

The 3-phenyl-7-hydrazinocoumarin of M.P. 174–175° used in this example can be produced from 3-phenyl-7-aminocoumarin as follows: 3-phenyl-7-aminocoumarin hydrochloride is diazotised in hydrochloric acid solution, the yellow diazonium salt obtained is converted with sodium sulphite into the corresponding cocumarinyl-(7')-hydrazine-N-sulphonic acid and the latter is hydrolysed by heating in mineral acid to the hydrazino compound or into its salt. The free hydrazine base is obtained from the mineral acid salt by reaction with aqueous ammonia solution.

If, in this example, the 25.2 parts of 3-phenyl-7-hydrazinocoumarin are replaced by 26.6 parts of 3-(m-tolyl)-7-hydrazinocoumarin or 26.6 parts of 3-(p-tolyl)-7-hydrazinocoumarin or 28.7 parts of 3-(p-chlorophenyl)-7-hydrazinocoumarine then the following pyrazole derivatives are obtained in an analogous manner:

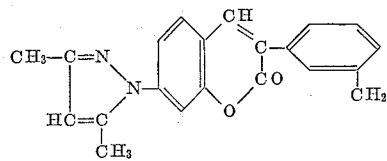

yellowish crystals M.P. 179–180°

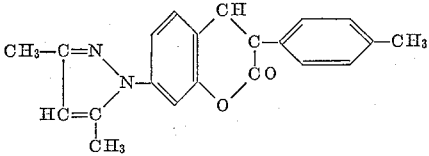

yellowish platelets M.P. 205°

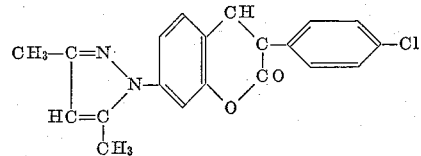

yellowish platelets M.P. 237–238°

These three compounds also fluoresce blue-violet in organic solution and can be used for the brightening of various substrata.

The intermediate products given above, 3-(m-tolyl)-7-hydrazinocoumarin (M.P. of hydrochloride 260° on decomposition), 3 - (p-tolyl) - 7 - hydrazinocoumarin (M.P. 215° on decomposition) and 3-(p-chlorophenyl)-7-hydrazinocoumarin (M.P. 220° on decomposition) are obtained analogously to the 3-phenyl-7-hydrazinocoumarin already described from the corresponding 3-aryl-7-aminocoumarins.

Example 2

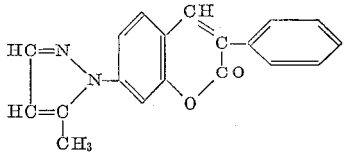

28.9 parts of 3-phenyl-7-hydrazinocoumarin hydrochloride are distributed while stirring in 280 parts by volume of ethylene glycol monoethyl ether and 19.8 parts of β-ketobutyraldehyde dimethyl acetal are added. The suspension obtained is heated while stirring for 3 hours at 90–100°, the solution of 15 parts of crystallised sodium acetate in 30 parts of water is added to the brown mixture and the whole is cooled to room temperature. The brownish precipitate is filtered off, washed with alcohol and water and purified by recrystallisation from benzene/ligroin. 3-phenyl-7-[5′-methylpyrazolyl-(1′)]-coumarin is obtained in fine, felted needles which melt at 188°. The new coumarin derivative fluoresces violet in dioxan solution. In methanolic solution, at 335 mμ, the product has an absorption maximum of (log $\epsilon_{max}$ 4.44). This compound too is suitable for the optical brightening of organic substrata.

In an analogous manner the same coumarin compound is obtained if instead of 28.9 parts of 3-phenyl-7-hydrazinocoumarin chloride 33.1 parts of 3-phenyl-7-hydrazinocoumarin-N-sulphonic acid are used.

If, in this example, the 28.9 parts of 3-phenyl-7-hydrazinocoumarin hydrochloride are replaced by 30.3 parts of 3-(m-tolyl)-7-hydrazinocoumarin hydrochloride, then 3-(m-tolyl) - 7 - [5′-methylpyrazolyl-(1′)]-coumarin which melts at 153° is obtained in an analogous manner. In organic solution, this pyrazole derivative also has a violet fluorescence and can be used as an optical brightener. At 335 mμ, its light absorption maximum in methanol is: log $\epsilon_{max}$=4.43.

Example 3

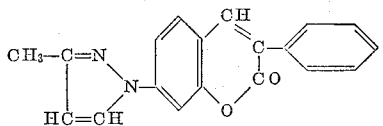

25.2 parts of 3-phenyl-7-hydrazinocoumarin are added to a solution of 16 parts of β-ketobutyraldehyde dimethyl acetal in 300 parts of ethylene glycol monoethyl ether and the whole is heated to 100°. A dark yellow solution which fluoresces blue-green is obtained which no longer contains free 3-phenyl-7-hydrazinocoumarin. After adding 2 parts of 30% hydrochloric acid, the mixture is heated for 6 hours at 100–110° while stirring and then allowed to cool to room temperature. The crude 3-phenyl-7-[3′-methylpyrazolyl - (1′)] - coumarin separates out of the brown reaction solution in brownish, shiny crystals. The product is filtered off, washed with alcohol and, to purify, is recrystallised from chlorobenzene, toluene or ethylene glycol monoethyl ether with the addition of decolouring charcoal. The pure coumarin forms pale yellowish coloured crystals which melt at 216–217°. In organic solution, the new coumarin derivative has an intensive blue-velvet fluorescence. In methanol at 346 mμ its light absorption maximum is: log $\epsilon_{max}$=4.54. The product is an excellent brightening agent for various organic substrata such as, e.g., synthetic textile fibres based on polyesters and polyamides such as terephthalic acid glycol polyester fibres, di- to tri-acetyl cellulose fibres, synthetic polypeptide fibres from adipic acid and hexamethylenediamine or from ε-aminocapronic acid or the lactam thereof.

Other similarly effective brightening agents are obtained, if, in this example, instead of 16 parts of β-ketobutyraldehydedimethylacetal a corresponding number of parts of propionylacetaldehyde - dimethylacetal or phenylacetylacetaldehyde-dimethylacetal is used.

Example 4

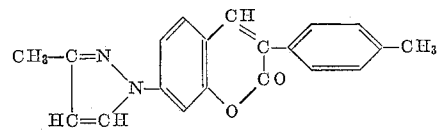

26 parts of β-ketobutyraldehyde dimethyl acetal and 26.6 parts of 3-(p-tolyl)-7-hydrazinocoumarin are stirred overnight at room temperature in 500 parts by volume of ethylene glycol monomethyl ether and, after the addition of 25 parts of glacial acetic acid, heated for 6 hours at 90°. After cooling, the yellow reaction product is filtered off, washed with ethylene glycol monomethyl ether and alcohol and recrystallised from toluene with the addition of decolouring charcoal. The 3-(p-tolyl)-7-[3′-methylpyrazolyl-(1′)]-coumarin obtained forms yellowish crystals which melt at 240° and which fluoresce blue-violet in organic solution. The new compound can be used for the brightening of the polyamide fibres more particularly described in Example 3.

If, in this example, the 26.6 parts of 3-(p-tolyl)-7-hydrazinocoumarin are replaced by 28.7 parts of 3-(p-chlorophenyl)-7-hydrazinocoumarin, then 3-(p-chlorophenyl)-7 - [3′ - methyl-pyrazolyl-(1′)]-coumarin which melts at 244° is obtained. This coumarin derivative also fluoresces blue-violet in organic solution and can be used for the brightening of organic substrata.

Example 5

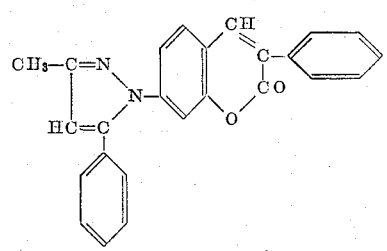

9.75 parts of benzoyl acetone are added to 125 parts of glacial acetic acid and this is reacted with 12.6 parts of 3-phenyl-7-hydrazinocoumarin first for 1 hour at room temperature and then for 5 hours at 90–95°. After cooling, the yellowish reaction product is filtered off and purified by recrystallisation from toluene. The 3-phenyl-7-[3′-methyl-5′-phenylpyrazolyl - (1′)] - coumarin obtained crystallises in colourless needles which melt at 204° and, in a mixture of dimethyl formamide and alcohol, it fluoresces blue-violet. The product can be used for the brightening of synthetic textile fibres. In methanol its light absorption maximum at 338 mμ is: log $\epsilon_{max}$=4.42.

If, in this example, the 9.75 parts of benzoyl acetone are replaced by 13.5 parts of dibenzoyl methane, then the pale yellowish coloured 3-phenyl-7-[3′,5′-diphenylpyrazolyl-(1′)]-coumarin is obtained in an analogous manner. It melts at 230°. In organic solution, this product too fluoresces blue-violet. In methanol, its light absorption maximum at 344 mμ is: log $\epsilon_{max}$=4.50.

Example 6

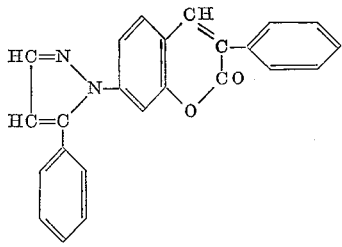

12.6 parts of 3-phenyl-7-hydrazinocoumarin are suspended in 125 parts of glacial acetic acid and 10 parts of the sodium salt of ω-hydroxymethylene acetophenone ("Bülow, v. Sicherer" B 34, 3891) are added. The yellow slurry obtained is then refluxed for 5 hours while stirring. After cooling, the yellow precipitate is filtered off, washed with glacial acetic acid, alcohol and water and is purified by recrystallisation from toluene. The desired 3-phenyl-7-[5'-phenyl-pyrazolyl-(1')]-coumarin is obtained as yellow crystals, M.P. 235°, which fluoresce blue-violet in alcoholic solution. This product also can be used for the brightening of organic substrata.

Example 7

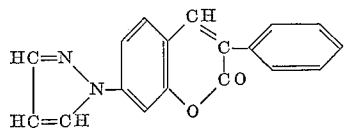

12.6 parts of 3-phenyl-7-hydrazinocoumarin are suspended in 125 parts of glacial acetic acid and 12 parts of malonic aldehyde-tetraethyl acetal are added within 10 minutes at room temperature. The whole is then heated to 90° and stirred for 8 hours at 90–100°. On cooling, a yellowish precipitate separates out from the dark brown solution, which, after completely cooling, is filtered off, washed with glacial acetic acid and water and purified by recrystallisation from chlorobenzene.

Example 8

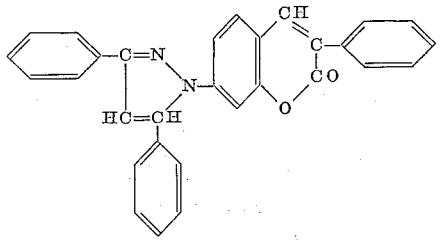

12.6 parts of 3-phenyl-7-hydrazinocoumarin and 10.4 parts of benzalacetophenone in 150 parts of glacial acetic acid are refluxed with stirring for 12 hours and the mixture is allowed to cool. The 3-phenyl-7-[3',5'-diphenyl-pyrazolinyl-(1')]-coumarin which forms as a yellow precipitate is filtered off, washed with glacial acetic acid and alcohol and dried. The pyrazoline derivative forms a yellow powder and has a green to blue-green fluorescence in organic solution. To convert into the corresponding pyrazole, 8.8 parts of bromine are added to 22.1 parts of the pyrazoline obtained in 220 parts of chloroform, the addition being made within 30 minutes at 30–40°, and the brownish reaction mixture is stirred at 50–60° until no more hydrogen bromide is developed. The chloroform is then distilled off, the dark residue is well mixed with a solution of 10 parts of crystallised sodium acetate in 100 parts of alcohol and 100 parts of water, the brown precipitate is filtered off under suction, washed with alcohol and water, dried for a short time and recrystallised from toluene with the addition of decolouring charcoal. In this way, 3-phenyl-7-[3',5'-diphenylpyrazolyl-(1')]-coumarin is obtained in the form of yellow crystals which melt at 230°. It is identical with the product produced according to Example 5.

Example 9

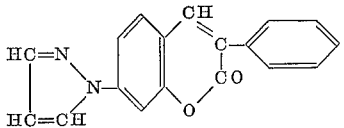

12.6 parts of 3-phenyl-7-hydrazinocoumarin are suspended in 150 parts of glacial acetic acid, 9.6 parts of propargyl aldehyde diethyl acetate are added within 10 minutes and the mixture is heated for 6 hours at 100° while stirring. After cooling, the precipitated product is filtered off, washed with glacial acetic acid and alcohol and recrystallised from toluene. The 3-phenyl-7-pyrazolyl-(1')-coumarin (M.P. 228–229°) described in Example 7 is obtained in this way.

Example 10

(a) *Production of 1-(m-sulphophenyl)-3-methyl pyrazole.*—104 parts of phenyl hydrazine-m-sulphonic acid and 22 parts of sodium hydroxide are dissolved in 700 parts of water and 90 parts of 1,1-dimethoxy-3-oxo-butane are added with stirring at 10°. The mixture obtained is then stirred for 14 hours at 20–25° and then for 3 hours at 90–100°. Decolouration charcoal is added to the brownish, clear solution whereupon it is filtered and the sodium salt of 1-(m-sulphophenyl)-3-methyl pyrazole is salted out by the addition of 20% sodium chloride. After cooling, the product is filtered off, washed with 15% aqueous sodium chloride solution and dried at 80° in vacuo. In this way, a yellowish-grey powder which easily dissolves in water is obtained.

(b) *Production of 1-(m-hydroxyphenyl)-3-methyl pyrazole.*—418 parts of the sodium salt of the sulphonic acid produced according to (a) and a solution of 440 parts of sodium hydroxide in 1000 parts of water are heated for 6 hours at 260–270° in a steel autoclave (pressure 37 atm). The brownish crystal slurry so obtained is dissolved (hot) in 1200 parts of water, filtered hot over decolouration charcoal and the 1-(m-hydroxyphenyl)-3-methyl pyrazole formed is precipitated by the addition of 145 parts of acetic acid. The crude product obtained is a brownish powder. To purify, the crude 1-(m-hydroxyphenyl)-3-methyl pyrazole is recrystallised from 600 parts by volume of benzene. The pure compound forms white crystals which melt at 104°.

(c) *Production of 2-hydroxy-4-(3'-methylpyrazolyl-(1'))-benzaldehyde.*—105 parts of 1-(m-hydroxyphenyl)-3-methylpyrazole and 173 parts of sodium hydroxide are dissolved in 325 parts of ethanol and 360 parts of water at 70°, and 115 parts of chloroform are added at 72–77° within 15–20 minutes with stirring. The dark brown solution obtained is stirred for 1 hour at 72–75° and then left to stand for 14 hours at room temperature. Water and solvent are distilled off under vacuum, the brown residue is dissolved in 1000 parts of water, the solution is filtered and the filtrate acidified with acetic acid until litmus paper is turned red. The resin-like body which precipitates is separated by decantation and stirred with 1000 parts by volume of ether. Undissolved particles in the ether solution are removed by filtration and the filtrate is concentrated. In this way, a brownish oil (crude aldehyde) is obtained which is further reacted with benzyl cyanide. With alcoholic ferric chloride solution, the product has a blue-violet colour reaction.

(d) *3-phenyl-7-[3'-methylpyrazolyl-(1')]-coumarin.*—100 parts of the crude aldehyde obtained according to (c) are dissolved in 250 parts by volume of 100° alcohol and first 52 parts by volume of benzyl cyanide and then 10 parts of piperidine are added. The whole is then heated for 1 hour at 75–80°, another 25 parts of piperidine are added whereupon the mixture is then refluxed for 20 hours. The yellow solution obtained is added to 3000 parts by volume of 10° acetic acid and the mixture obtained is refluxed for hours while stirring. A brown oil separates out which, on cooling, solidifies into brown lumps. The crude product obtained in this way is separated by decanting from the aqueous solution and is then rubbed with 500 parts of alcohol. During this operation, the brown resin-like side products dissolve in the alcohol and, after filtering off from the alcohol, a pale grey solid body is obtained. The desired 3-phenyl-7-[3′-methylpyrazolyl-(1′)]-coumarin can be obtained from the latter in a pure form by recrystallisation from benzene/ligroin. The product is identical with the coumarin derivative obtained according to Example 3.

*Example 11*

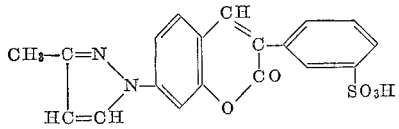

76 parts of 3-phenyl-7-[3′-methylpyrazolyl-(1′)]-coumarin are dissolved at 20–25° with stirring in 750 parts by volume of sulphuric acid monohydrate and the solution is stirred for 14 hours at room temperature. A clear brownish solution is formed which in day light has a violet fluorescence. To work up, the sulphonation mixture is poured onto 3000 parts of ice while stirring, 1500 parts by volume of saturated aqueous sodium chloride solution are added to the white slurry which separates, it is heated to 50–70°, again cooled and the product is filtered off under suction. The product is suspended in 3000–4000 parts of water and neutralised, while stirring, with dilute sodium carbonate solution. After filtering off, the new compound is dried at 70–80°. The sodium salt of 3-(m-sulphophenyl)-7-(3′-methyl-1′-pyrazolyl)-coumarin obtained is a pale yellowish powder which is soluble in water. The diluted aqueous solution has a violet-blue fluorescence and can be used as an optical brightener for polyamide fibres.

Products having a similar action are obtained if, in the above example, the 3-phenyl-7-[3′-methylpyrazolyl-(1′)]-coumarin is replaced by a corresponding amount of 3-(p-tolyl)-7-[3′-methylpyrazolyl-(1′)] - coumarin or 3 - (p-chloro-phenyl)-7-[3′-methylpyrazolyl-(1′)]-coumarin.

*Example 12*

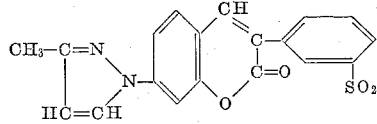

30 parts of 3-phenyl-7-[3′-methylpyrazolyl-(1′)]- coumarin are dissolved at 0–5° in 300 parts of chlorosulphonic acid and the solution is stirred for 14 hours at room temperature. On pouring onto ice, the sulphochloride separates as a yellowish precipitate. The product is filtered off under suction, washed with water and dried. The sulphochloride so obtained is used for the production of the sulphamides. Also the sodium salt of the 3-(m-sulpho-phenyl)-7-[3′-methylpyrazolyl-(1′)]-coumarin obtained according to Example 11 can be used with good results for the production of the sulphochloride.

10 parts of the sulphochloride described above are suspended in 150 parts by volume of chlorobenzene and 6 parts of 3-dimethylamino-propylamine are added at 45°. The pale yellow suspension obtained is then stirred for 30 minutes at 100°, quickly brought to the boil, filtered hot and, after cooling, the crystals which precipitate are filtered off. The product is purified by recrystallisation from chlorobenzene. The pale yellow needles melt at 210° and dissolve in diluted acetic acid with a violet fluorescence.

$C_{24}H_{26}O_4N_4S$.—Calculated: 61.79% C; 5.62% H; 12.01% N; 6.87% S. Found: 61.64% C; 5.58% H; 12.03% N; 7.09% S.

The new brightening agent can be used for the optical brightening of polyacrylonitrile fibres from an acid solution.

The following amides are produced in a manner analogous to that described above.

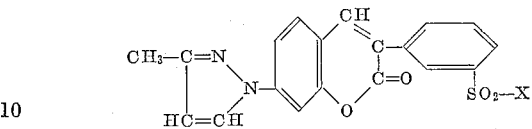

wherein X can have the following meanings:

$X = -NH_2$
$X = -NH-CH_3$
$X = -NH-C_2H_5$
$X = -NH-CH_2-CH_2OH$
$X = -N(CH_3)_2$
$X = -N(C_2H_5)_2$
$X = -NH-CH_2-CH_2-OCH_3$
$X = -NH-CH_2-CH_2-OC_2H_5$
$X = -NH-CH_2-CH_2-N(C_2H_5)_2$

These sulphonamides can be used for the brightening of polyester and polyamide fibres.

Equally active products are also obtained in an analogous manner if, in this example, the 3-phenyl-7-[3′-methylpyrazolyl-(1′)]-coumarin is replaced by the equivalent amount of 3-phenyl-7-pyrazolyl-(1′)-coumarin.

*Example 13*

10 parts of a pale yellowish stable fibre fabric made from polyadipic acid hexamethylenediamide (nylon, of E. I. du Pont de Nemours, Wilmington, Del., U.S.A.) are dyed for 30 minutes at 75° in a bath (liquor ratio 1:40) containing 0.01 part of 3-phenyl-7-[3′,5′-dimethylpyrazolyl-(1′)]-coumarin and 0.2 part of an olein alcohol pentadecyl glycol ether. The goods are then rinsed and dried. In daylight, the nylon fabric so treated has a considerably more white appearance than the same but untreated fabric.

*Example 14*

10 parts of fabric made from polyterephthalic acid glycol ester, marketed as "Dacron," having a faintly yellowish appearance are dyed for 30 minutes at 95–100° in a bath (liquor ratio 1:50) which contains 0.005 part of 3-phenyl-7-[3′-methylpyrazolyl - (1′)] - coumarin and 0.3 part of an olein alcohol pentadecyl glycol ether. The goods are then rinsed and dried. The material so treated has a much more white appearance than an untreated comparable sample of the same origin.

*Example 15*

10 parts of uncoloured acetylcellulose yarn are dyed for 30 minutes at 75° in a bath (liquor ratio 1:30) which contains 0.01 part of 3-(m-tolyl)-7-[3′-methylpyrazolyl-(1′)]-coumarin in a finely dispersed form. After rinsing and drying, the yarn so treated has a considerably more white appearance than before the treatment.

*Example 16*

100 parts of uncoloured nylon fabric are washed for 30 minutes at 70° in a washing liquor (liquor ratio 1:10) which contains 0.05 part of the 3-phenyl-7-[5′-methylpyrazolyl-(1′)]-coumarin prepared in Example 2 and 8 parts of a synthetic washing agent. The goods are then rinsed and dried. The fabric so treated has a much more brilliant appearance than fabric washed without the addition of brightening agent.

*Example 17*

10 parts of polyethylene terephthalate fabric are dyed for 30 minutes at 90–100° in a bath (liquor ratio 1:30) which contains 0.01 part of 3-(p-chlorophenyl)-7-[3′-methyl-pyrazolyl-(1′)]-coumarin 0.3 part of o-dichloro-benzene and 0.1 part of octyl-phenol dodecaglycol ether.

13

After rinsing and drying, the fabric has a considerably more white appearance than before treatment.

Example 18

A polyethylene terephthalate fabric is foularded at room temperature with a liquor which contains 0.6 part of 3-(p-tolyl)-7-[3′,5′-dimethylpyrazolyl-(1′)]-coumarin and 1.5 parts of nonylphenol dodecaglycol ether in 1000 parts of water. The fabric is squeezed out to a 75% content and dried at 60°. It is then heated for 15 minutes at 125–130°. In this way, a fabric of brilliant white appearance is obtained.

Example 19

A solution of 0.05 part of 3-phenyl-7-[3′-methylpyrazolyl-(1′)]-coumarin in toluene is added to 100 parts of polyethylene terephthalate chips in a mixer, the whole is well mixed and then the solvent, while further processing, is removed in a vacuum at 70–80°. The chips so treated are then put into a stainless steel autoclave with 0.4 part of titanium dioxide. The contents of the autoclave are heated to 270–280° while excluding air, the melt obtained is well mixed for 1 hour under weak nitrogen pressure at 270° while stirring, kept at this temperature for 30 minutes without stirring and then the liquid polymerisate is pressed under nitrogen through a valve in the form of bands or filaments. The polyester fibres so produced have a very high degree of whiteness.

Example 20

300 parts of hexanediamine adipate are dissolved in 300 parts of distilled water at about 80°. 1.8 parts of sebacic acid, 1.2 parts of titanium dioxide (Anatas) and 0.3 part of 3-phenyl-7-[3′,5′-dimethylpyrazolyl-(1′)]-coumarin are added to this solution and the whole is stirred until a homogeneous distribution is attained. A stainless steel autoclave is heated to about 150°, the liquid mixture is poured thereinto and the temperature is raised within one hour to 280° while excluding oxygen. During this time the pressure in the autoclave is kept below 30 atmospheres by liberation of steam. After the maximum temperature of 280–290° has been attained, the pressure is reduced within 10 to 20 minutes to atomspheric pressure by liberation of the volatile parts. The mass is then kept for 4 hours at 280° and atmospheric pressure while excluding oxygen. At the end of this time the condensation has proceeded so far that the polycondensate can be spun through a valve on the floor of the autoclave under nitrogen pressure. The superpolyamide fibres so obtained have a brilliant white shading which has good fastness to light.

A similar white effect is obtained if, in the above example, the 0.3 part of 3-phenyl-7-[3′,5′-dimethylpyrazolyl-(1′)]-coumarin is replaced by 0.15 part of 3-phenyl-7-[3′-methylpyrazolyl-(1′)]-coumarin.

Example 21

500 parts of polyamide chips from ε-carprolactam, 1.5 parts of titanium dioxide and 0.25 part of 3-phenyl-7-[3′-methylpyrazolyl-(1′)]-coumarin are mixed in a rotation mixer for 10 hours, melted in a stainless steel autoclave at 250–260° while excluding oxygen, pressed under nitrogen through a valve and streched 400%. A brilliant white fibre having good fastness to light is obtained.

Example 22

0.06 part of 3-phenyl-7-pyrazolyl-(1′)-coumarin and a mixture of 67 parts of polyvinyl chloride powder, 33 parts of dioctyl phthalate, 2 parts of di-n-butyl dilauryl dioxystannate and 0.3 part of sodium pentaoctyl tripolyphosphate are gelatinised for 15 minutes at 160° on a set of mixing rollers and then drawn out into sheets. The polyvinyl chloride foils so prepared have a violet fluorescence in daylight and a considerably more white appearance than those produced without the addition of this brightening agent.

Example 23

0.03 part of 3-phenyl-7-[3′-methylpyrazolyl-(1′)]-coumarin, 7 parts of titanium dioxide (Anatas), 67 parts of polyvinyl chloride, 33 parts of dioctyl phthalate, 2 parts of dibutyl-tin-dialurate and 0.3 part of sodium pentaoctyl tripolyphosphate are worked up into an opaque sheet as described in the previous example. The foil so prepared has a much more white appearance than a sample produced without the addition of brightener.

Example 24

0.2 parts of 3-phenyl-7-[5′-methylpyrazolyl-(1′)]-coumarin, 5 parts of titanium dioxide (Anatas), 75 parts of acetyl cellulose and 25 parts of diethyl phthalate are homogenised in 900 parts of acetone to form an opaque solution which is then poured onto glass plates. After evaporation of the acetone, an opaque film which can be removed is obtained. This film is a much more clear white than a sample produced without brightening agent.

What we claim is:

1. A compound of the formula

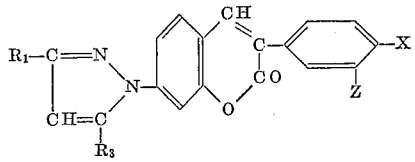

wherein
$R_1$ is a member selected from the group consisting of hydrogen, methyl, ethyl, phenyl and benzyl,
$R_3$ is a member selected from the group consisting of hydrogen, methyl and phenyl and
X is a member selected from the group consisting of hydrogen, chlorine and methyl and
Z is a member selected from the group consisting of hydrogen, $-SO_3H$, $-SO_2H_2$, $-SO_2NH-CH_3$, $-SO_2-NH-CH_2CH_3$, $-SO_2-NH-CH_2CH_2OH$,
$-SO_2-NH-CH_2CH_2OCH_3$
$-SO_2-NH-CH_2CH_2-OCH_2CH_3$ $$-SO_2-NH-CH_2CH_2N-CH_2CH_3$$
$$\phantom{-SO_2-NH-CH_2CH_2N-}CH_2-CH_3$$

$$-SO_2-NH-CH_2CH_2CH_2NCH_3$$
$$\phantom{-SO_2-NH-CH_2CH_2CH_2N}CH_3$$

$$-SO_2-N-CH_3, \quad -SO_2-N-CH_2CH_3$$
$$\phantom{-SO_2-N}CH_3 \phantom{, -SO_2-N-}CH_2CH_3$$

2. A compound of the formula

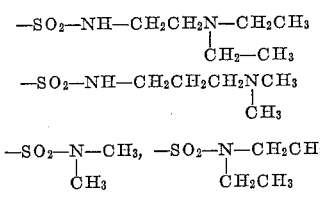

3. A compound of the formula

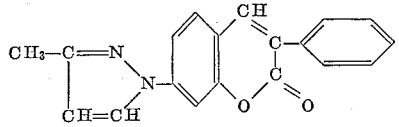

4. A compound of the formula

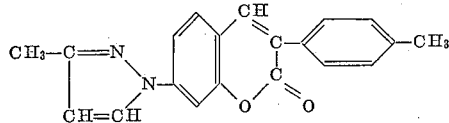

5. A compound of the formula
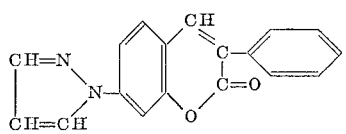
6. A compound of the formula
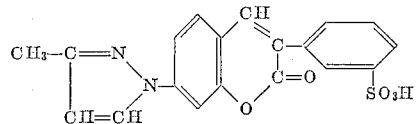
References Cited in the file of this patent
UNITED STATES PATENTS
| | | |
|---|---|---|
| 2,654,713 | Fleck | Oct. 6, 1953 |
| 2,844,594 | Long et al. | July 22, 1958 |
| 2,945,033 | Hausermann | July 12, 1960 |